Patented Sept. 6, 1938

2,128,961

UNITED STATES PATENT OFFICE 2,128,961

COATED PRODUCT AND PROCESS WHEREBY PREPARED

Gordon D. Patterson, Wilmington, Del., assignor to E. I. du Pont de Nemours & Company, Wilmington, Del., a corporation of Delaware No Drawing. Application June 8, 1936,
Serial No. 84,231

11 Claims. (Cl. 91—68)

This invention relates to coated articles and to methods for producing them. It relates in particular to the use of deacetylated chitin as a sealer or primer for porous non-fibrous inorganic surfaces such as plaster, which treated surfaces may or may not carry a suitable finish coat.

This is a continuation in part of copending application Serial No. 11,320, filed March 15, 1935, which has issued as U. S. Patent 2,047,220, incorporated herein.

Chitin is the chief component of the horny exoskeletons of crustacea such as shrimp, crabs, and lobsters. According to currently accepted theories, it is a polymer of an acetylated glucosamine. A method has recently been developed by G. W. Rigby, United States Patent 2,040,879 for the chemical treatment of chitin with alkali under controlled conditions whereby chitin is deacetylated to the extent that it becomes soluble in dilute aqueous acids but not to the point where the chitin molecule is so changed or degraded that the product is incapable of being formed into coherent films. This product, termed "deacetylated chitin", is the one which I use in my present invention, and by the quoted expression I mean a product which is soluble in aqueous acids and not degraded beyond the film-forming stage.

This invention has as an object a process of coating non-fibrous inorganic surfaces, particularly porous non-fibrous inorganic surfaces, with or without subsequent coating of the same with orthodox coating compositions. A further object is the primed and/or coated article thus produced. Other objects will appear hereinafter.

These objects are accomplished by the following invention wherein a porous non-fibrous inorganic base material, e. g., plaster, is coated with deacetylated chitin. On the dried coated or primed base material there may then be applied if desired a coating of an orthodox coating composition, e. g. a paint, lacquer, varnish, or non-vitreous enamel.

Due to their porous nature, plaster, concrete, brick, tile and other inorganic building and construction materials are subject to more or less deterioration and change in surface characteristics and appearance due to the facility with which water, moisture, oils, dirt, smoke, grease, tars and the like penetrate therein. Once soiled in such manner, these surfaces are difficult or impossible to clean. I have found that deacetylated chitin, when applied to porous, non-fibrous, inorganic surfaces, decreases or prevents penetration therein of these contaminants, thus prolonging the normal unsoiled appearance of the surface, and also rendering the surface more readily cleanable when it does become soiled. The deacetylated chitin, in addition, improves the strength of the surface of the base material, lessens its tendency to dust off, and reduces the destructive effects of moisture. I have also found that deacetylated chitin is a very effective primer for porous, non-fibrous inorganic surfaces which are to be finished with a paint, lacquer or enamel, since it prevents penetration therein of the coating composition vehicle, thereby obviating the necessity of a plurality of finish coats. I have further found that a deacetylated chitin priming coat prevents bleeding of oil-soluble staining materials from the base into the finish coat. I have additionally discovered that porous, non-fibrous inorganic surfaces primed with deacetylated chitin develop with one finish coat a gloss which is equal to that secured with at least two coats of the same finish without primer. Finally, I have found that the deacetylated chitin primer often lessens the tendency of the finish coat to fail by cracking.

In carrying out my invention, a solution of deacetylated chitin in dilute aqueous acid (which may properly be considered an aqueous menstruum containing in solution a salt of deacetylated chitin) is applied to the porous, non-fibrous inorganic base material which is then dried. On the thus coated and dried surface, there may then be applied if desired a finish coat of an organic film-forming material.

In a preferred embodiment of this invention, the porous, non-fibrous inorganic surface is primed with the above mentioned aqueous menstruum containing a salt, e. g. an acetate, of deacetylated chitin and on the primed and dried surface there is applied an organic coating composition, the vehicle of which comprises a film-forming polyhydric alcohol ester of drying oil acids, e. g. a drying oil, a drying oil modified alkyd resin, or a varnish obtained by blending a drying oil with a natural or synthetic resin, such as rosin, ester gum and oil-soluble phenolformaldehyde resins.

In another preferred embodiment of the invention, the finish coat is based upon or contains an organic film-forming material which is chemically resistant to aqueous solutions of alkalis or alkaline earths such as sodium and calcium hydroxides. Such solutions exist in porous inorganic surfaces containing lime or Portland cement, for example, and will, under certain conditions, destroy oil-type film-forming materials by saponification.

In the examples which follow, reference is made to deacetylated chitin of different viscosities in poises. This is the viscosity at 25° C. of an arbitrary standard, viz., a 5 per cent solution in 5 per cent aqueous acetic acid. Deacetylated chitin is further arbitrarily considered to be of the low viscosity type if the viscosity of the standard solution at 25° C. is in the range 1-35 poises, of the medium viscosity type if the standard is in the range 35-250 poises, and of the high viscosity type if the standard is above 250 poises. Application Serial No. 731,600 describes in detail how to prepare deacetylated chitin of a wide range of viscosity. Deacetylated chitin of viscosity less than one poise is generally too degraded to be of use in this invention.

The following examples illustrate but do not limit the invention.

*Example I*

A block of porous calcium hydrosilicate of a type which readily absorbed orthodox paints and enamels was primed over part of its surface with a 5 per cent solution in 1.5 per cent acetic acid of 200-poise deacetylated chitin and over another portion of its surface with an aqueous composition comprising 44 per cent pigment and 3.5 per cent low viscosity deacetylated chitin. A third portion of the surface was left unprimed. After drying, the entire block was coated with a white enamel based on a 48.6 per cent drying oil modified alkyd resin. After drying, the coatings over the primed portions of the block were of normal gloss, while the rest of the block had no gloss at all. Such priming treatments are even more effective on other porous, non-fibrous inorganic surfaces such as plaster, cement, tile, and brick. On these materials even 2 per cent solutions of medium viscosity deacetylated chitin produce a decidedly beneficial effect. Beneficial effects are obtained in the process just illustrated regardless of whether the finish coat is a drying oil, drying oil modified alkyd resin, or a varnish or enamel based on a drying oil and a natural or synthetic resin.

The deacetylated chitin may be applied to the porous inorganic non-fibrous base as a solution of the deacetylated chitin in the stoichiometrical amount or more of any dilute aqueous acid. The strength of the acid should preferably be in the range 0.5-10 per cent, and the concentration of the deacetylated chitin therein about 0.5-15 per cent, higher strength acid being used with higher concentrations of deacetylated chitin in order to insure a chemical sufficiency of acid. The acid used should preferably be volatile in order that the primed surface may be more readily rendered water-resistant. Suitable acids are acetic, lactic, hydrochloric, formic, and others mentioned in Rigby U. S. Patent 2,040,879.

If desired, the solution of deacetylated chitin in aqueous acid may have water-immiscible liquids or water-insoluble low-melting solids emulsified therein, or it may have finely divided solids such as pigments dispersed therein, or it may contain both liquids and solids of this type. These emulsions and dispersions, in addition to providing the necessary sealing effect, also have decorative, hiding, or water-proofing effects. Regardless of whether or not the solution of deacetylated chitin in acid contains solids or liquids therein, it may be said to be an aqueous menstruum containing in solution a salt of deacetylated chitin.

The deacetylated chitin priming coat should be adequately dried prior to any application of a finish coat. Drying may as a rule be effected simply by exposure to the atmosphere for a few hours though it may if desired be hastened by heating. The rate of insolubilization in water may be increased by various chemical treatments such as with ammonia, formaldehyde, and other agents named in Rigby, U. S. Patent 2,040,880.

While low viscosity grades of deacetylated chitin can be used effectively for many purposes, medium viscosity grades are especially desirable and economical for sealing the porous, non-fibrous inorganic surface, since 2-3 percent solutions thereof are usually effective and have sufficient penetration to bond well to the base. With dispersions, the low viscosity grades of deacetylated chitin are especially desirable since they permit of a much higher concentration of solid material.

The use of deacetylated chitin as a primer often lessens the tendency of a subsequent coating to fail by cracking. This was shown by priming concrete over part of its surface with a deacetylated chitin solution followed by one coat of a pigmented drying oil modified alkyd resin coating over the entire surface. On weathering, the coating over bare unprimed concrete developed fine cracks which collected dirt, giving the coating a poor appearance, while over the primed areas the coating remained intact and of good appearance.

Deacetylated chitin can also be applied to advantage over a previously coated porous, non-fibrous inorganic surface. In this system, it forms a thin, hard, and tough protective coating which protects the sub coat against scratching, dirt, grease, solvents, and the like and yet which may be removed by vigorous scrubbing with soap and water or better by washing with diluted vinegar. Improved adhesion of deacetylated chitin to such coatings is obtained when small amounts of active solvents are contained in the deacetylated chitin solutions used or when specific salts of deacetylated chitin are used.

I have also found that deacetylated chitin is an effective sealer and primer, not only for non-fibrous bases such as plaster, brick, and the like, but also for such bases as asbestos-cement board, which, while reinforced by fibrous materials, have surfaces essentially non-fibrous though porous. I accordingly include such bodies within the meaning of the expression "porous, non-fibrous, inorganic surface". The following example illustrates this variation of my invention.

*Example II*

A 3 per cent solution of 200-poise deacetylated chitin in 1 per cent aqueous acetic acid was applied to a sheet of asbestos-cement board. The dried sheet was found to have excellent oil and grease resistance without the excessively varnished appearance caused by sealers heretofore used on asbestos-cement board. In comparison, an unsealed sheet of this particular base was found to be penetrated easily by oils and greases and permanently stained thereby.

When the porous inorganic, non-fibrous base material has been stained by oil-soluble materials as dyes, creosote, asphalt and the like, a prime coat comprising deacetylated chitin is effective in preventing bleeding of such material into subsequently applied non-aqueous coatings. This is illustrated by the following example.

*Example III*

Plaster, stained by asphalt, was primed over part of its surface with a 2 per cent solution of 200-poise deacetylated chitin in 0.7 per cent aqueous acetic acid, over another part with a 2 per cent solution of 6-poise deacetylated chitin in 0.7 per cent aqueous acetic acid, and over still another part with a flat paint containing 3.5 per cent of 3-poise deacetylated chitin and about 44 per cent of pigment. A portion of the surface was left unprimed. A finish coat of ordinary paint was then applied over both primed and unprimed areas. Where the asphalt treated plaster was unprimed, the asphalt penetrated into and through the finish coat very badly. A slight penetration through the 6-poise deacetylated chitin was observed, but none at all could be detected through the 200-poise deacetylated chitin or through the deacetylated chitin flat paint primer.

Deacetylated chitin has thus been found effective (a) as a primer for porous, non-fibrous inorganic materials which are to be subsequently coated as is illustrated in Example I, (b) as a sealer for such surfaces which are not to be subsequently coated as is shown in Example II, and (c) as a protective coat for stained, porous, non-fibrous inorganic surfaces which are to be subsequently coated, as is shown in Example III. In variation (a), penetration of the finish coat into the surface is prevented, obviating the necessity for a plurality of coats; retention of the normal gloss of the finish coat is permitted; and cracking is arrested or prevented. In variation (b), penetration of contaminating substances into the surface is prevented or arrested; the surface of the base material is strengthened; and its tendency to dust off is lessened. In variation (c), the bleeding of the strain into and through the finish coat is prevented.

While for many uses, or for certain base materials it is necessary that there be a true and continuous film of deacetylated chitin over the base, in other cases the deacetylated chitin primer need not form a continuous coating.

Deacetylated chitin forms tough films, is unaffected by alkalies and is insoluble in and not penetrated by nearly all organic liquids. It is non-hygroscopic, and does not become sticky. It is soluble in most acids to form viscous solutions, many of which become water insoluble on thorough drying and all of which become insoluble by heat or suitable chemical treatment as with compounds which react with amines, i. e., aldehydes as formaldehyde, anhydrides, acid halides, and the like. It is an excellent emulsifying and dispersing agent for a large variety of materials. Emulsions usually do not break on drying but are difficult to redisperse. Dispersed materials are firmly bonded to most non-metallic base materials on drying. This unique combination of properties makes systems comprising deacetylated chitin especially valuable as sealers or as primers for non-fibrous porous inorganic base materials. Not being affected by alkali, it is especially useful over surfaces alkaline in reaction. Such surfaces frequently occur among calcium-containing construction materials, particularly those based on lime, Portland cement, and calcium hydrosilicate. Deacetylated chitin is in general an effective primer and sealer for cement-containing products such as concrete, concrete brick and blocks, cinder concrete, stucco, porous concrete, asbestos cement board and terrazzo. It is also effective over gypsum products, such as gypsum plaster, plaster of Paris, and precast gypsum elements such as gypsum wall board and the like. It is likewise effective on magnesite cement products, e. g. flooring, stucco, etc.; on lime plaster; on sand-lime brick; on Morbelli cement; and on clay products, e. g. the various types of brick, tile and the like. Other construction materials of this general nature may likewise be effectively sealed or primed with deacetylated chitin.

While this invention has been described in terms of deacetylated chitin and its solutions in dilute acid, systems containing modifying agents such as wetting agents, mildew inhibitors, chemical reactants or potential reactants, suitable softeners and the like in suitable amounts are also applicable. The term deacetylated chitin, when it applies to the material deposited on the porous, non-fibrous inorganic base, may refer to the material itself, to its salts or to the product deposited upon a base and heated or treated with alkali, ammonia, formaldehyde, or with chemicals reacting with amines. Certain salts, as the nitrourea salt may even become acid-, alkali- and water-insoluble on drying. Any such products are included under the term deacetylated chitin as used in describing the finished articles. The term deacetylated chitin when used in the claims with no connotation of solution therefore includes deacetylated chitin itself and derivatives, such as those just enumerated.

The coating compositions useful over bases primed with deacetylated chitin are essentially unlimited although non-aqueous coatings are preferred. With aqueous coatings, the rate of penetration of water into the base material is decreased, but since such coatings usually are flat paints, appearance is not so greatly improved as is the case with non-aqueous coatings. Aqueous systems containing organic film-forming materials, for example, aqueous emulsions of paints, may be used over deacetylated chitin primers with success. As already pointed out, however, the benefits of that phase of the invention dealing with the primed and coated porous, non-fibrous, inorganic surface are most apparent when the finish coat comprises a film-forming polyhydric alcohol ester of drying oil acids, of which the following are typical: drying oils such as linseed, China wood, oiticica, walnut, and perilla oils, which may be raw or bodied; alkyd resins modified by these and other drying oils, one method for making such resins being described in Kienle, U. S. 1,893,873; and varnishes or enamels made with these or other drying oils and natural resins such as rosin, Congo and kauri or synthetic resins such as tertiary heptylphenol-formaldehyde resin and other oil-soluble phenol-formaldehyde resins. Where the surface to be coated is strongly alkaline or potentially so, the finish coat is preferably a more highly alkali-resistant film-forming material, such as chlorinated rubber, rubber isomer (prepared by treating rubber with such agents as stannic chloride, sulfuric acid, and ethyl sulfuric acid), vinyl resins, resinous polymers of monohydric alcohol esters of alpha-methylene aliphatic monocarboxylic acids such as ethyl acrylate and methyl alpha-methacrylate, cellulose esters, e. g. the acetate and nitrate, cellulose ethers, e. g., ethyl and crotyl celluloses, urea-formaldehyde resins, and polyether resins of the type defined in Arvin Serial No. 651,634, filed January 13, 1933. Especially desirable for alkaline surfaces are coating compositions based on methacrylate, vinyl, and urea-formaldehyde resins.

The above description and examples are intended to be illustrative only. Any modification or variation thereof which conforms to the spirit of the invention is intended to be included within the scope of the following claims.

I claim:

1. A product comprising a plaster surface treated with deacetylated chitin, said treated surface having a coating thereover of a drying oil modified alkyd resin.

2. A product comprising a plaster surface treated with deacetylated chitin, said treated surface having a coating thereover of a drying oil paint.

3. A product comprising a plaster surface treated with deacetylated chitin, said treated surface having a coating thereover comprising a film-forming polyhydric alcohol ester of drying oil acids.

4. A product comprising a porous, non-fibrous, inorganic surface treated with deacetylated chitin, said treated surface having a coating thereover of a drying oil modified alkyd resin.

5. A product comprising a porous, non-fibrous, inorganic surface treated with deacetylated chitin, said treated surface having a coating thereover of a drying oil paint.

6. A product comprising a porous, non-fibrous, inorganic surface treated with deacetylated chitin, said treated surface having a coating thereover of a film-forming polyhydric alcohol ester of drying oil acids.

7. A product comprising a plaster surface treated with deacetylated chitin, said treated surface having a coating thereover of a film-forming material of the class consisting of drying oils, resins, and cellulose derivatives.

8. A product comprising a rigid porous, non-fibrous, inorganic base having therein and thereon deacetylated chitin.

9. A rigid porous non-fibrous inorganic surface having a coating thereon of deacetylated chitin.

10. A rigid porous non-fibrous inorganic surface having a coating thereon of deacetylated chitin and thereover a coating of an organic, film-forming material.

11. A product comprising a rigid porous non-fibrous inorganic surface treated with deacetylated chitin, said treated surface having a coating thereover of a film-forming material of the class consisting of drying oils, resins, and cellulose derivatives.

GORDON D. PATTERSON.